United States Patent Office 3,377,315
Patented Apr. 9, 1968

3,377,315
ANTIOXIDANTS
Stanley Ashton, Graham Howard Rayner, and Gerald Scott, Manchester, England, assignors to Imperial Chemical Industries Limited, London, England, a corporation of Great Britain
No Drawing. Filed Dec. 5, 1963, Ser. No. 328,181
Claims priority, application Great Britain, Dec. 10, 1962, 46,470/62
5 Claims. (Cl. 260—45.75)

ABSTRACT OF THE DISCLOSURE

The compounds are of the class of acylaminodiphenylamines which are useful as stabilizers for natural and synthetic polymers and mineral oils.

---

This invention relates to new organic chemical compounds of value in the stabilisation of natural and synthetic rubbers, rubber articles and latices, polymers and mineral oils.

It has been found that certain acylaminodiphenylamines, which are new chemical compounds, are especially valuable agents for the preservation of natural and synthetic rubbers, polymers and mineral oils against deterioration particularly due to oxidation.

Thus according to the invention there are provided as new chemical compounds acylaminodiphenylamines of the formulae:

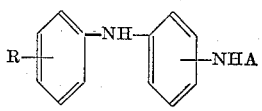

wherein R stands for a hydrogen atom or an alkyl or cycloalkyl group and A stands for an acyl group derived from an aliphatic or cycloaliphatic carboxylic acid containing at least four carbon atoms.

As alkyl groups which may be represented by R there may be mentioned for example methyl, ethyl and isopropyl. As cycloalkyl groups there may be mentioned cyclohexyl and α-methyl-cyclohexyl. The group which may be represented by R may be in any free position in the benzene ring but is preferably in the p-position.

As aliphatic carboxylic acids there may be mentioned tny straight chain or branched chain aliphatic acid containing at least four carbon atoms and which may be saturated or unsaturated. The acid may be a monocarboxylic acid, dicarboxylic acid, or polycarboxylic acid and may contain substituents such as chloro, cyano or alkoxy groups. The carbon chain may contain heteroatoms such as oxygen, sulphur or nitrogen.

As examples of acids from which the acyl groups may be derived there may be mentioned butyric, pivalic, valeric, lauric, mystic, stearic, oleic, adipic, succinic, sebacic, capric and cyclohexanecarboxylic acids.

The preferred acyl groups are those derived from straight chain aliphatic monocarboxylic acids containing from ten to twenty carbon atoms.

The acylamido group may be in any free position of the benzene ring but is preferably in the p-position.

The acylaminodiphenylamines may be manufactured from the corresponding aminodiphenylamines by any conventional method for the acylation of aromatic amines, for example by treatment with the corresponding acid chloride in the presence of an acid acceptor. Any other conventional acylating agent derived from the acids, for example acid anhydrides, may be used under the conditions known in the art for the use of acylating agents of that class.

According to the invention there is further provided an improved process for the preservation of natural and synthetic rubbers, rubber articles and latices, polymers and mineral oils which comprises the incorporation therein of acylaminodiphenylamines as hereinbefore defined.

The synthetic diolefine or diene rubbers which may be used include for example polymers, including cis-polymers, of butadiene-1:3, isobutene, 2-methylbutadiene-1:3 and 2-chlorobutadiene-1:3 and copolymers of these compounds with each other and with acrylonitrile, styrene, methyl methacrylate and other well known polymerisable compounds which are used in the manufacture of synthetic rubbers. The polymers which may be used include for example polyethylene and, particularly, polypropylene, including the cis-polymers, and also polyamides such as polyhexamethylene adipamide and polyurethanes.

The acylaminodiphenylamines may be employed in the preservation of rubber, rubber articles, latices of natural rubber or synthetic rubbers including cis-polybutadiene and cis-polyisoprene, polymers and mineral oils, according to the usual methods. Thus, for example, when used for preserving rubber they may be mixed with the rubber or rubber latex alone or with vulcanising and other ingredients including amorphous, macrocrystalline and microcrystalline waxes and the resulting mixes then cured by heat treatment, or they may be mixed with rubber along with other compounding ingredients and the mixture may be vulcanized by treatment with sulphur monochloride in the cold.

When used for preserving polymers which are polyolefins such as polyethylene or polypropylene the acylaminodiphenylamine may be incorporated into the polymer by any conventional method for example by mixing the acylaminodiphenylamine and polymer by shaking together in powder form followed by heating on a mill at a suitable temperature or by dissolving the acylaminodiphenylamine in a solvent, adding this to the powdered polymer, and evaporating and either milling or extruding or spinning above the melting point.

When used for polymers such as polyamides such as polyhexamethylene adipamide the acylaminodiphenylamine may be mixed with polymer in powder or chip form before spinning, or may be added to the polymer dissolved in a solvent such as formic acid which is subsequently removed, or in the form of a solution or dispersion may be used to treat the polymer after spinning.

The acylaminodiphenylamines when used for the preservation of rubber are preferably added in amount between 0.1 and 5.0% of the weight of rubber: in the cases of polymers such as polyethylene, polypropylene and polyamides and mineral oils the preferred amounts are between 0.01 and 1.0%. Larger or smaller amounts may however be used if desired.

The rubber compositions may contain the rubber in any form, for example in massive, dispersed or fabricated form, and may be vulcanized or unvulcanized. In addition they may contain known adjuvants used in rubber compositions, for example pigments, fillers, plasticisers, blowing agents, antiozonants, vulcanising agents, accelerators, retarders and waxes.

The acylaminodiphenylamines are of special value in both natural and synthetic rubbers, particularly when such rubbers contain carbon black. The hitherto known antioxidants based on aromatic diamines tend to migrate from rubber vulcanisates and will cause staining of pale coloured rubber, enamel or plastic articles with which the vulcanisates come into contact; many hitherto known phenolic antioxidants are free from staining but are inefficient antioxidants in rubbers containing carbon black; in contrast the acylaminodiphenylamines are highly effective in rubbers containing carbon black and do not cause staining of other articles with which the rubbers are in contact. In respect of this absence of stain these acylaminodiphenylamines show unexpected advantage over those acylaminodiphenylamines in which the acyl group contains less than four carbon atoms. In addition to being powerful antioxidants these acylaminodiphenylamines are good antiozonant sand have copper deactivating properties.

In polymers such as polyolefins, especially polypropylene, addition of the acylaminodiphenylamine results in an exceptional increase in resistance to degradation by oxidation, heat and light. This resistance is still further enhanced by the use in addition of compounds such as sulphides; for example dilauryl thiodipropionate, phosphite esters such as tris-nonylphenyl phosphite, phenyl dioctyl phosphite or trilauryl trithiophosphite, dialkyldithiophosphates such as zinc diisopropyldithiophosphate, dialkyl dithiocarbamates such as zinc dinonyldithiocarbamate, or u.v. absorbing agents such as 2-hydroxy-4-alkyloxybenzophenone for example 2-hydroxy-4-otcyloxybenzophenone. These additives should be used in amounts similar to those of the acylaminodiphenylamines. In polyamides addition of the acylaminodiphenylamines increases the resistance of the polyamide to degradation especially by heat. This resistance to degradation is shown particularly in retention of tensile strength and renders the polyamides so stabilised of especial value in applications such as tyre-cord.

The invention is illustrated but not limited by the following examples in which all parts and percentages are by weight unless otherwise stated.

Example 1

18.4 parts of 4-aminodiphenylamine are dissolved at room temperature in 600 parts of chloroform and 7.9 parts of pyridine (7.9 g.:0.1 mole) are then added and the mixture is stirred at room temperature. To the mixture is added dropwise at room temperature 21.8 parts of lauroyl chloride and the mixture is then stirred for a further 1 hour at room temperature. The insoluble solid product is filtered off, washed with cold chloroform, dried and recrystallised from a mixture of isopropanol and water with treatment with active carbon.

The chloroform filtrates contain more product and are washed with water, then with dilute aqueous hydrochloric acid and then with water until acid free. The chloroform solution is then dried over anhydrous sodium sulphate and the chloroform removed by distillation. The solid residue remaining is dissolved in isopropanol, the solution treated with active carbon, filtered to remove the carbon, and diluted with water to precipitate the product which is crystallised from a mixture of isopropanol and water. The total yield of 4-lauroyl-aminodiphenylamine, melting at 120–121° C. is 85%. This material on analysis contains carbon, 78.7%, hydrogen, 9.3% and nitrogen, 7.64%, the theoretical analysis for $C_{24}H_{34}ON$ being carbon, 78.7%, hydrogen, 9.3%, and nitrogen, 7.8%.

By a similar procedure using the appropriate acid chlorides there are obtained 4-stearoylaminodiphenylamine, melting at 129–130° C., 4-nonanoylaminodiphenylamine, melting at 120–121° C., 4-myristoylaminodiphenylamine, melting at 125–126° C., bis-(4-diphenylamino)adipamide, melting at 260–261° C. and bis(4-diphenylamino)sebacamide, melting at 221–222° C.

Example 2

The 4-acylaminodiphenylamines listed in the table below are added to polypropylene powder and shaken for 5 minutes. The mixtures are milled at 170° C. for 5 minutes and sheets of thickness between 0.45–0.55 mm. are pressed at 130° C. and cooled under pressure. Samples of the sheet are heated in a single cell air oven at 150° C. until embrittlement of the sample occurs. A comparison of the embrittlement times indicates the differences in stability of the various samples. The embrittlement time obtained using a commercial antioxidant is 1056 hours.

TABLE I

| | Concentration, percent | Embrittlement time (hours) |
|---|---|---|
| Acyl group of acylaminodiphenylamine: | | |
| Lauroyl | 0.5 | 960 |
| Myristoyl | 0.5 | 1,440 |
| Stearoyl | 0.5 | 2,230 |

Similar tests are made in which 0.25% of dilauryl thiodipropionate is also added to the polypropylene. The results given in Table II show the increased efficiency obtained.

TABLE II

| | Concentration, percent | Embrittlement time (hours) |
|---|---|---|
| Acyl group of acylaminodiphenylamine: | | |
| Nonanoyl | 0.25 | 1,056 |
| Lauroyl | 0.25 | 2,568 |
| Stearoyl | 0.25 | 2,736 |

Example 3

Rubber mixes of the following compositions are compounded on a mill and cured in a press for 15 minutes at 153° C. Samples of the vulcanisates are then aged in an air oven at 100° C. and other samples in an oxygen bomb under 300 lbs./sq. in. pressure at 70° C. and the tensile strengths determined at intervals. The results are shown in Table III comparing N-lauroylaminodiphenyl against 4-isopropylaminodiphenylamine of which the antioxidant efficiency is well established.

| | Mix A | Mix B | Mix C |
|---|---|---|---|
| Smoked Sheet Natural Rubber | 100 | 100 | 100 |
| Stearic acid | 3 | 3 | 3 |
| Zinc oxide | 3.5 | 3.5 | 3.5 |
| High abrasion furnace carbon black | 45 | 45 | 45 |
| Processing oil | 3.5 | 3.5 | 3.5 |
| Cyclohexylbenzthiazyl sulphenamide | 0.5 | 0.5 | 0.5 |
| Sulphur | 2.5 | 2.5 | 2.5 |
| 4-lauroylaminodiphenylamine | | 0.5 | |
| 4-isopropylaminodiphenylamine | | | 0.5 |

TABLE III.—HEAT AGEING AT 100° C.

| | Tensile strength, kg./cm.² | | |
|---|---|---|---|
| | Mix A | Mix B | Mix C |
| Unaged | 248 | 262 | 325 |
| Aged 1 day at 100° C | 134 | 213 | 236 |
| Aged 2 days at 100° C | 51 | 116 | 140 |
| Aged 3 days at 100° C | (¹) | 60 | 69 |
| OXYGEN BOMB AGEING, 300 LBS./SQ. IN. AT 70° C. | | | |
| Unaged | 248 | 246 | 265 |
| Aged 4 days | 50 | 167 | 191 |
| Aged 6 days | (¹) | 125 | 127 |
| Aged 8 days | | 102 | 75 |
| Aged 12 days | | 68 | 58 |

¹ Perished.

Example 4

Rubber mixes of the following compositions are compounded on a mill press cured for 15 minutes at 153° C.

| | Mix D | Mix E | Mix F | Mix G |
|---|---|---|---|---|
| Smoked Sheet Natural Rubber | 100 | 100 | 100 | 100 |
| Stearic acid | 3 | 3 | 3 | 3 |
| Zinc oxide | 3.5 | 3.5 | 3.5 | 3.5 |
| High Abrasion furnace carbon black | 45 | 45 | 45 | 45 |
| Processing oil | 3.5 | 3.5 | 3.5 | 3.5 |
| Cyclohexylbenzthiazylsulphenamide | 0.5 | 0.5 | 0.5 | 0.5 |
| Sulphur | 2.5 | 2.5 | 2.5 | 2.5 |
| 4-stearoylaminodiphenylamine | | 0.5 | | |
| 4-myristoylaminodiphenylamine | | | 0.5 | |
| 4-isopropylaminodiphenylamine | | | | 0.5 |

Samples of the vulcanisates are aged as described in Example 1 and changes in tensile strengths are given in Table IV

TABLE IV.—HEAT AGEING AT 100° C.

| | Tensile strength, kg./cm.² | | | |
|---|---|---|---|---|
| | Mix D | Mix E | Mix F | Mix G |
| Unaged | 298 | 296 | 290 | 318 |
| Aged 1 day | 119 | 194 | 201 | 228 |
| Aged 2 days | 47 | 91 | 82 | 100 |
| OXYGEN BOMB AGEING, 300 LBS./SQ. IN. AT 70° C. | | | | |
| Unaged | 266 | 247 | 260 | 260 |
| Aged 4 days | 60 | 166 | 167 | 176 |
| Aged 12 days | (¹) | 70 | 79 | 72 |

¹ Perished.

Example 5

Rubber mixes of the following compositions are made up and cured for 18 minutes at 153° C. The vulcanisates are placed in contact with plasticised p.v.c. and exposed to u.v. irradiation for 6 hours and the p.v.c. surface examined at intervals for staining. P.v.c. in contact with mixes H, I, J and K showed no migration stain after this treatment.

| | Mix H | Mix I | Mix J | Mix K |
|---|---|---|---|---|
| Pale crepe natural rubber | 100 | 100 | 100 | 100 |
| Stearic acid | 1 | 1 | 1 | 1 |
| Zinc oxide | 25 | 25 | 25 | 25 |
| Titanium dioxide | 50 | 50 | 50 | 50 |
| Powdered chalk | 15 | 15 | 15 | 15 |
| Mercaptobenzthiazole | 0.5 | 0.5 | 0.5 | 0.5 |
| Sulphur | 2.5 | 2.5 | 2.5 | 2.5 |
| 4-N-lauroylaminodiphenylamine | | 2 | | |
| 4-N-stearoylaminodiphenylamine | | | 2 | |
| 4-N-myristoylaminodiphenylamine | | | | 2 |

Example 6

0.13 part of a 0.4% solution in formic acid of stearoylaminodiphenylamine is added to 5 parts of 10% polyhexamethylene adipamide solution in formic acid. A film of polyamide is then formed by spreading the solution on a glass slide and then after removal of the formic acid in an oven at 100° C. is aged in an air oven at 220° C.

The colour of the sample is compared with that of a similar nylon film without stabiliser. After 30 minutes, the stabilised nylon is considerably less discoloured than the control.

Example 7

Rubber mixes of the following compositions are compounded on a mill and press cured for 30 minutes at 153° C.

| | Mix L | Mix M |
|---|---|---|
| Pale crepe natural rubber | 100 | 100 |
| Zinc oxide | 10 | 10 |
| Blanc Fixe | 75 | 75 |
| Stearic acid | 1 | 1 |
| Copper stearate | 0.2 | 0.2 |
| Suphur | 3.0 | 3.0 |
| Diphenylguanidine | 0.5 | 0.5 |
| 4-N-stearoylaminodiphenylamine | | 2.0 |

Samples of the vulcanisates are aged in the oxygen bomb under 300 lbs./sq. ins. pressure at 70° C. and the tensile strengths are determined at intervals. The results are given in Table V showing the protection obtained with 4-N-stearoylaminodiphenylamine in the presence of copper contamination.

TABLE V

| | Tensile strength, kg./cm.² | |
|---|---|---|
| | Mix L | Mix M |
| Unaged | 184 | 176 |
| Aged 2 days | (¹) | 73 |

¹ Perished.

What we claim is:

1. A polymer selected from the group consisting of natural rubber, synthetic diene rubber, polyethylene and polypropylene containing a stabilizing amount of an acylaminodiphenylamine of the formula

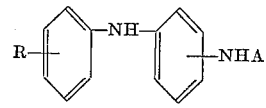

wherein R is selected from the group consisting of hydrogen, alkyl and cycloalkyl and A is an acyl group derived from an aliphatic carboxylic acid containing from 10 to 20 carbon atoms.

2. The polymer of claim 1 wherein the polymer is polypropylene and the stabilizer is 4-stearoylaminodiphenylamine.

3. The polymer of claim 2 wherein the stabilizer is present in amounts between 0.01 and 1.0% by weight of said polymer.

4. The polymer of claim 1 wherein there is also present a member selected from the group consisting of dilauryl thiodipropionate, tris-nonylphenyl phosphite, phenyl dioctyl phosphite, trilauryl trithiophosphite, zinc diisopropyldithiophosphite and zinc dinonyldithiocarbamate.

5. The polymer of claim 1 wherein there is also present 2-hydroxy-4-alkyloxybenzophenone as an ultra-violet absorbing agent.

References Cited

UNITED STATES PATENTS

| 1,907,545 | 5/1933 | Howland | 260—808 |
| 2,709,157 | 5/1955 | Hotten | 252—51.5 |
| 3,163,616 | 12/1964 | Stahly | 260—45.7 |
| 3,172,871 | 3/1965 | Malz et al. | 260—45.7 |
| 3,189,647 | 6/1965 | Symon | 260—45.9 |

DONALD E. CZAJA, *Primary Examiner.*

H. E. TAYLOR, *Assistant Examiner.*